(12) United States Patent
Katra et al.

(10) Patent No.: US 6,209,927 B1
(45) Date of Patent: Apr. 3, 2001

(54) ISOLATION DEVICE AND FLUID CONNECTION

(75) Inventors: Thomas S. Katra, Fayetteville; Patrick C. Marks, Minoa; Tracey A. Clancy, Syracuse; James S. Laub, Fayetteville, all of NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/393,485

(22) Filed: Sep. 10, 1999

(51) Int. Cl.$^7$ .............................. F16D 3/84; F16L 27/10
(52) U.S. Cl. ....................... 285/49; 285/229; 285/298; 285/225; 92/96
(58) Field of Search .................... 285/49, 225, 229, 285/298; 92/96, 103 M, 105

(56) References Cited

U.S. PATENT DOCUMENTS

| | | | |
|---|---|---|---|
| 2,038,855 | * | 4/1936 | Rosenblad ........................... 285/229 |
| 2,113,047 | * | 4/1938 | French ................................. 285/225 |
| 2,632,658 | * | 3/1953 | Mertz ................................... 285/229 |
| 3,249,378 | * | 5/1966 | See et al. ............................. 285/225 |
| 4,570,440 | * | 2/1986 | Doran ................................... 285/279 |
| 4,718,702 | * | 1/1988 | Rushforth et al. .................... 285/229 |
| 4,804,211 | * | 2/1989 | Larson et al. ........................ 285/225 |

FOREIGN PATENT DOCUMENTS

| | | | |
|---|---|---|---|
| 82719 | * | 10/1895 | (DE) ..................................... 285/225 |
| 10199 | * | 4/1912 | (GB) ..................................... 285/225 |
| 739267 | * | 10/1955 | (GB) ..................................... 285/225 |

* cited by examiner

*Primary Examiner*—Eric K. Nicholson

(57) ABSTRACT

A metal diaphragm is provided which acts as a spring while defining a flow path. A restraint limits upward movement of the diaphragm during transient motion. Downward movement is resisted by a Belleville spring.

4 Claims, 3 Drawing Sheets

ISOLATION DEVICE AND FLUID CONNECTION

BACKGROUND OF THE INVENTION

Rigid connections between members in a mechanical system can be a path of vibrational propagation between members. One arrangement in which this can occur is in a refrigeration system chiller where a compressor is mounted on a heat exchanger by a rigid connection through which fluid is transferred.

Screw compressors, especially high speed geared compressors, generate high levels of structure borne energy in a frequency range where components of the systems in which they are typically applied are very responsive. This often leads to unacceptably high radiated sound levels from both the compressors and the rigidly attached system components. The problem is particularly acute with compressors designed to be directly mounted on a heat exchanger shell such that the compressor is fully supported by a flange extending directly from the shell. This is because this joint tends to transmit energy very efficiently from the compressor to the heat exchanger shell. Reducing this transmission by conventional means such as elastomeric or helical springs is very difficult due to the conflicting requirements placed on the joint. Specifically, the joint must hermetically contain the refrigerant, withstand the operating pressure in the system, and be structurally robust, especially if the joint represents the sole support for the compressor. Additionally, space requirements are often very restrictive since minimizing package size is critical.

Several designs have been formulated to address the radiation of structurebome noise. They involve structurally decoupling the compressor from the heat exchanger. When transient events occur, however, the flexibility of the isolator may allow too much compressor motion. Additionally, during pressure testing in the factory, stress levels in the isolator may induce yielding, which would have a potential negative impact on performance and reliability.

SUMMARY OF THE INVENTION

The present invention is essentially a stand alone insertion installed between a compressor and a heat exchanger which supports the compressor and provides a fluid path between the compressor and heat exchanger. A flexible metal diaphragm acts as a spring to isolate vibration while defining a portion of the fluid path thereby fully containing the refrigerant. Hence, it can be incorporated without requiring any major design changes. The metal diaphragm is of an appropriate thickness and geometry to have the needed spring constant. Because the diaphragm member is thin and horizontal, space demands in the critical vertical direction are minimized. Since the design is 100% metallic, except for the seal structure, the diaphragm can be machined to the proper configuration or, if assembled, welding can be used to guarantee hermeticity. Additionally, no material compatibility problems with refrigerant and oil are raised, as would be the case with elastomeric materials.

The present invention includes a restraint that prevents the motion of the vibration isolator during large amplitude transient events or while the chiller undergoes a pressure test in the factory. Under normal compressor operation, the restraint is not in contact with the compressor side of the isolation system/diaphragm in order to prevent acoustic short circuiting of the isolator. When the system is pressure tested, however, the diaphragm deflects until the restraint is reached, much like a valve's opening movement being limited by a valve stop. At this point, further motion of the diaphragm is limited and the restraint becomes the primary load bearing member of the assembly. During a transient event, the isolator also can deflect until the diaphragm contacts the restraint and the load is again borne by the restraint.

It is an object of this invention to reduce heat exchanger vibration due to compressor excitation in a refrigeration or air conditioning system.

It is an additional object of this invention to use a metal diaphragm as a spring and to limit movement of the diaphragm during transient motion.

It is another object of this invention to reduce structure borne sound resulting from compressor operation.

It is an additional object of this invention to reduce overall sound radiation from a chiller.

It is a further object of this invention to provide an axially compact vibration isolator. These objects, and others as will become apparent hereinafter, are accomplished by the present invention.

Basically, a metal diaphragm is provided which acts as a spring while defining a flow path. A restraint limits upward movement of the diaphragm during transient motion. Downward movement is resisted by a Belleville spring.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
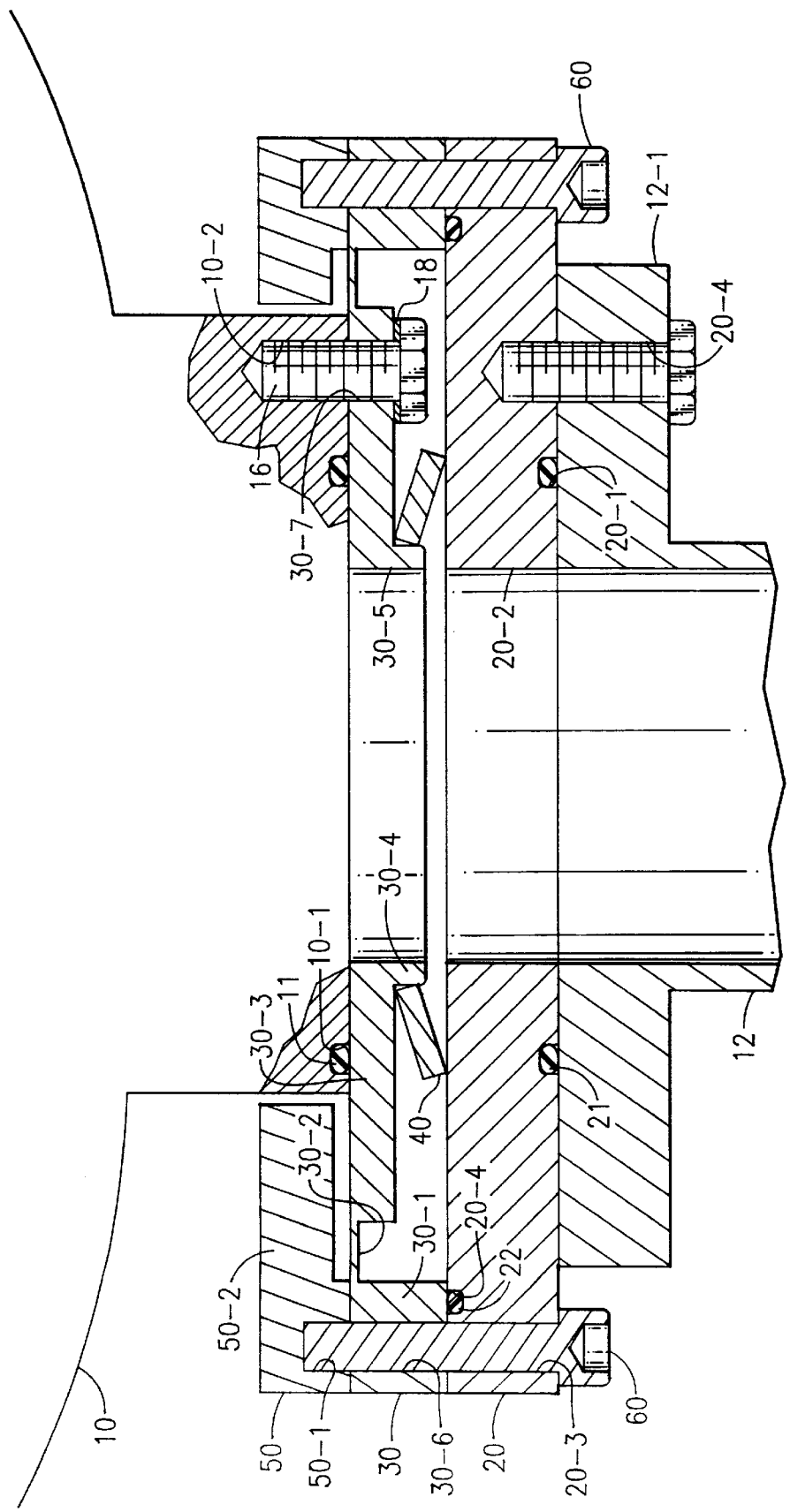
FIG. 1 is a sectional view of the present invention taken along line corresponding to 1—1 of FIG. 4 providing vibration isolation and a fluid connection between a compressor and a heat exchanger.
Figure 3:
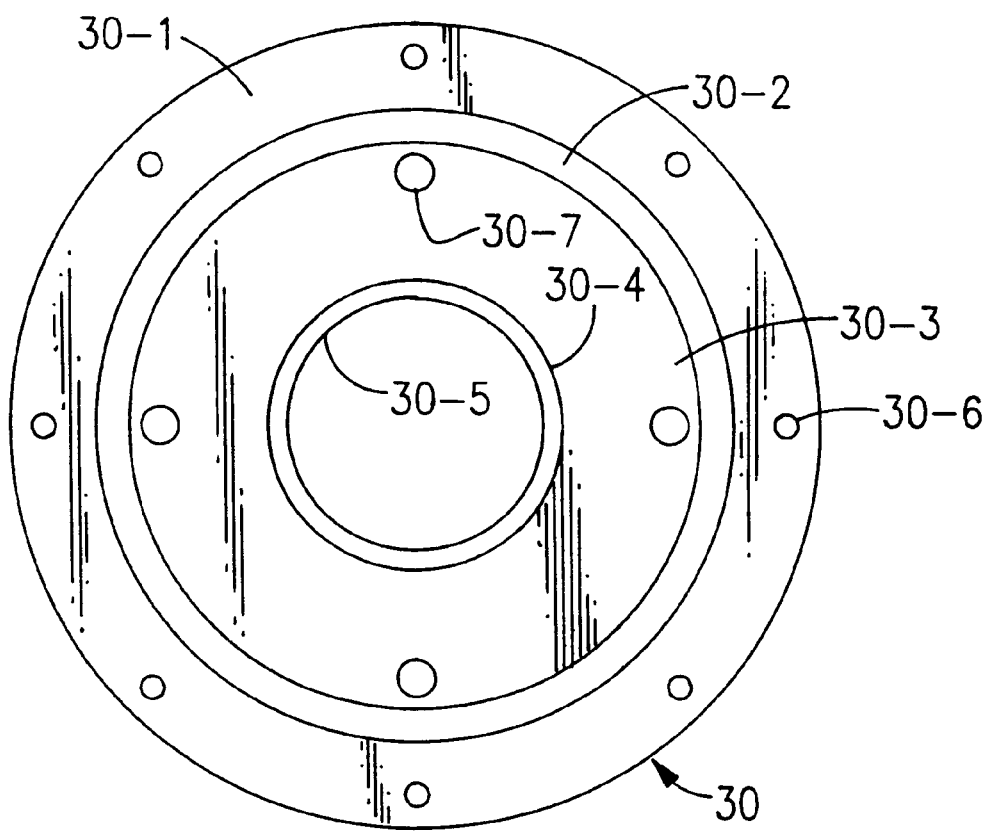
FIG. 3 is a view of the heat exchanger side of the diaphragm.

In FIG. 1 the numeral 10 generally designates a refrigerant compressor, such as a screw compressor, and the numeral 12 designates a cooler or evaporator of a refrigeration or air conditioning system. Compressor 10 has an annular groove 10-1 which receives o-ring 11. Diaphragm 30 is secured to compressor 10 by circumferentially spaced bolts 16 which extend through bores 30-7 in diaphragm 30 and are threaded into threaded bores 10-2 in compressor 10. Crush washers 18, or the like, underlie the heads of bolts 16 to provide a seal. If necessary, or desired, an annular groove can be formed in diaphragm 30 in place of annular groove 10-1. Flange 12-1 is overlain by annular mounting plate 20 which is illustrated in FIG. 3. A fluid seal is provided between mounting plate 20 and flange 12-1 by o-ring 21 which is located in an annular groove in either flange 12-1 or plate 20 with groove 20-1 in plate 20 being illustrated.

Figure 2:
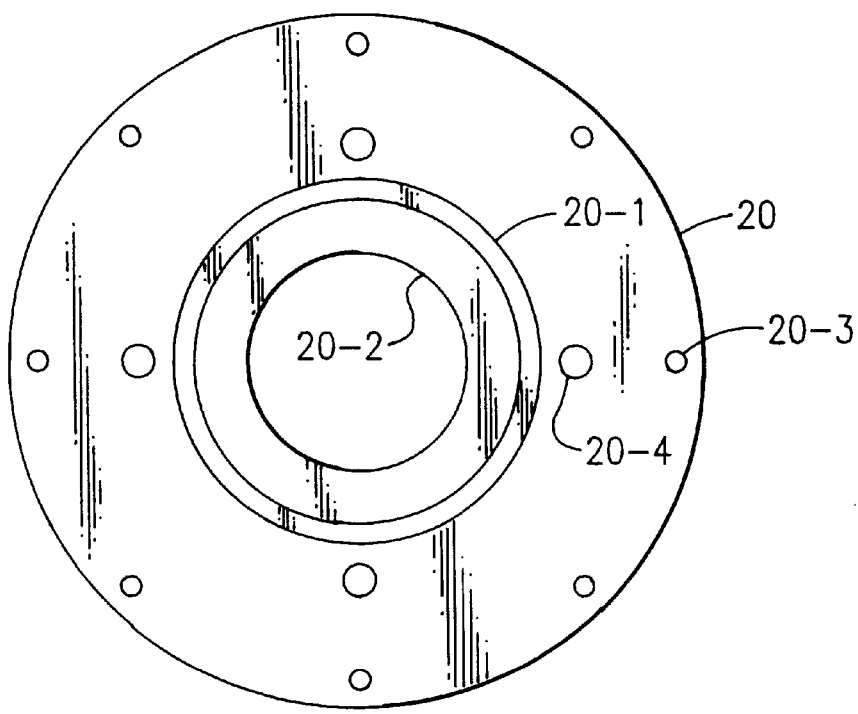
FIG. 2 is a view of the heat exchanger side of the mounting plate.
Figure 4:
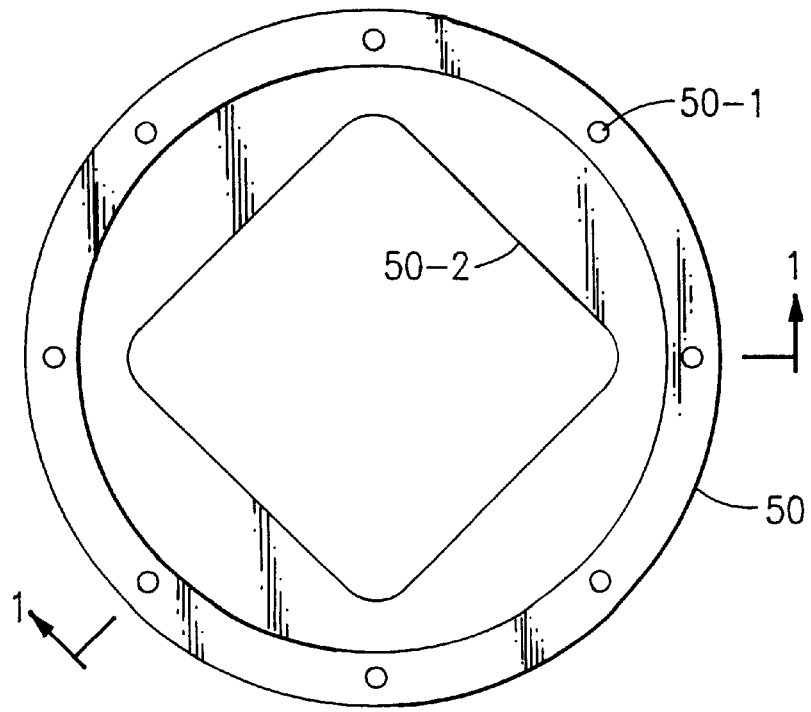
FIG. 4 is a view of the heat exchanger side of the restraint.

Diaphragm 30 which is illustrated in FIG. 2, overlies plate 20 and peripherally engages, and is supported by, plate 20. An o-ring 22 provides a fluid seal between mounting plate 20 and diaphragm 30 and is located in an annular groove in either diaphragm 30 or plate 20 with groove 20-4 in mounting plate 20 being illustrated. As noted, diaphragm 30 peripherally engages plate 20 and this is due to the fact that the outer portion 30-1 of diaphragm 30 is the portion with the greatest axial thickness. Immediately, radially inward of portion 30-1 is thinnest portion 30-2 which is capable of flexure responsive to compressor induced vibrations, etc. Radially inward of thinnest portion 30-2 is portion 30-3 which is of intermediate thickness such that it is rigid and, in use, supports the weight of compressor 10 but is separated from plate 20. Annular extension 30-4 is normally spaced from mounting plate 20 and forms a portion of bore 30-5 which is generally coaxial with bore 20-2 in plate 20 and bore 12-2 in evaporator 12. The engagement of annular extension 30-4 with plate 20 is one extreme position of diaphragm 30. Belleville spring or washer 40 surrounds annular extension 30-4 and engages portion 30-3 of diaphragm 30 and plate 20 and tends to keep them separated while supporting the weight of compressor 10. Belleville spring 40 is much stiffer than thinnest portion 30-2 and has a spring constant that is on the order of five times higher than that of thinnest portion 30-2.

Annular restraint 50 is secured to plate 20 and diaphragm 30 by circumferentially spaced bolts 60 which serially extend through bore 20-3 in plate 20, bores 30-6 in diaphragm 30 and are threaded into threaded bores 50-1 in restraint 50. Restraint 50 has a radially inwardly extending portion 50-2 which is normally separated from portion 30-2 of diaphragm 30 by a small distance which is on the order of 0.004 inches. Accordingly, the other extreme position of diaphragm 30 is when portion 30-2 engages portion 50-2 of restraint 50. Portion 50-2 acts in the manner of a valve stop in that it limits the movement/flexure of diaphragm 30 upon engagement of portion 50-2 by diaphragm 30. Mounting plate 20 is secured to the flange 12-1 by bolts 24 which extend through bore 20-4 and are threaded into threaded bore 20-4 of mounting plate 20.

In operation, diaphragm 30 will be separated from portion 50-2 of restraint 50. The resilience of diaphragm 30 coupled with the biasing force of Belleville spring 40 normally keeps annular extension 30-4 of diaphragm 30 separated from mounting plate 20. Accordingly, while there is a metal-to-metal contact of the compressor 10 with other members it is through the resilient coupling provided by Belleville spring 40 and thin portion 30-2 of diaphragm 30. Transient movement of diaphragm 30 is limited by portion 50-2 of restraint 50 and by contact between annular extension 30-4 with mounting plate 20. However, such contact is out of the range of movement during normal operation.

Although a preferred embodiment of the present invention has been specifically illustrated and described, other changes will occur to those skilled in the art. For example, the description has been specific to a chiller but is applicable to other fluid connections. Also, gaskets may be used in place of the o-rings and other suitable springs or biasing structure can be used in place of the Belleville spring. It is therefore intended that the scope of the present invention is to be limited only by the scope of the appended claims.

What is claimed is:

1. An isolation device and fluid connection for fluidly connecting a first and a second structural member wherein said first structural member is supported by said second structural member and said first and second structural members are in a system requiring fluid communication between said first and second structural members comprising:

a first supporting member having an opening therein and a first and second side with said first side adapted to engage said first structural member in a fluid tight relationship;

a second supporting member;

said first supporting member being of varying axial extent with an outer portion being of greatest axial extent and with an intermediate portion being of least axial extent such that said portion of least axial extent permits flexure, and with an inner portion normally spaced from said second supporting member;

said second supporting member having an opening therein and a first and a second side with said first side of said second supporting member adapted to engage said outer portion of said second side of said first supporting member in a fluid tight relationship and second side of said second member adapted to engage said second structural member in a fluid tight relationship;

a resilient member located between said first and second supporting members and biasing said inner portion of said first supporting member away from said second supporting member;

a restraint axially separated from said intermediate portion of said first supporting member so as to limit movement of said first supporting member in a direction away from said second supporting member.

2. The isolation device and fluid connection of claim 1 wherein said resilient member is a Belleville spring.

3. The isolation device and fluid connection of claim 2 wherein said Belleville spring has a spring constant much greater than that of said intermediate portion of said first supporting member.

4. The isolation device and fluid connection of claim 1 further including means for securing said first and second structural members together with said first and second supporting members therebetween.

* * * * *